Dec. 16, 1969   A. E. GEILS ETAL   3,483,633
AUDIOVISUAL EDUCATIONAL APPARATUS
Filed Feb. 13, 1967   6 Sheets-Sheet 1
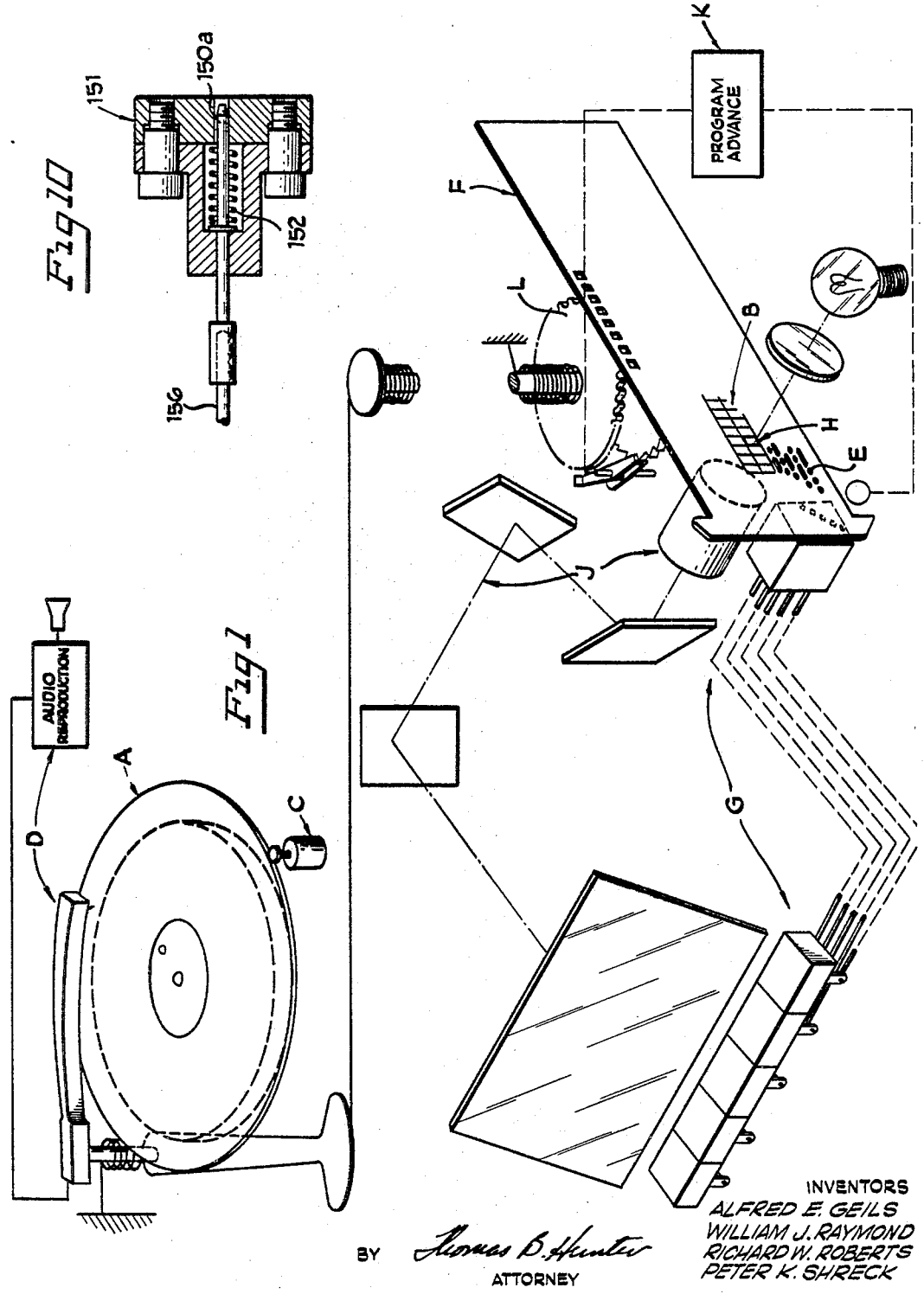
INVENTORS
ALFRED E. GEILS
WILLIAM J. RAYMOND
RICHARD W. ROBERTS
PETER K. SHRECK
BY Thomas B. Hunter
ATTORNEY Dec. 16, 1969     A. E. GEILS ET AL     3,483,633
AUDIOVISUAL EDUCATIONAL APPARATUS
Filed Feb. 13, 1967     6 Sheets-Sheet 2
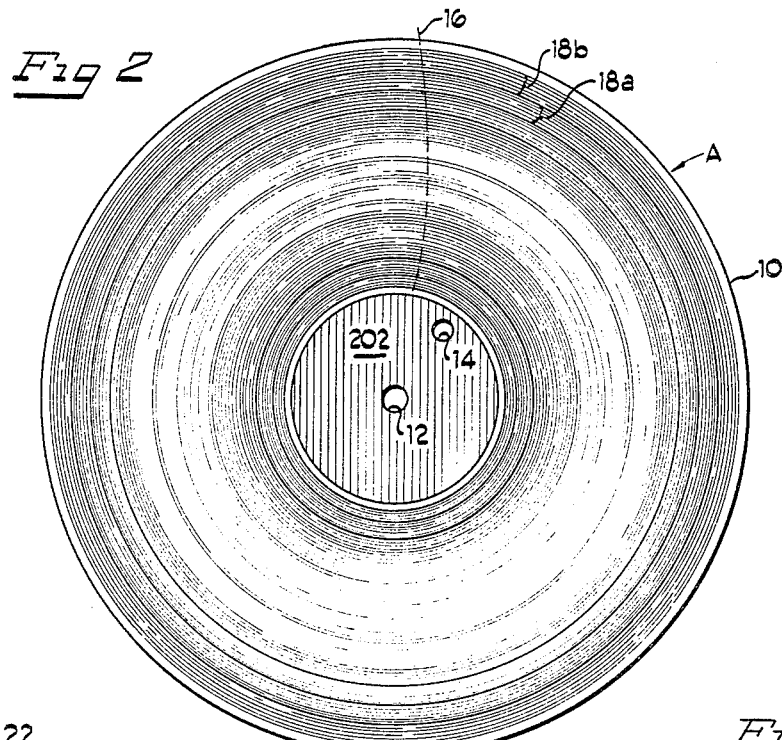
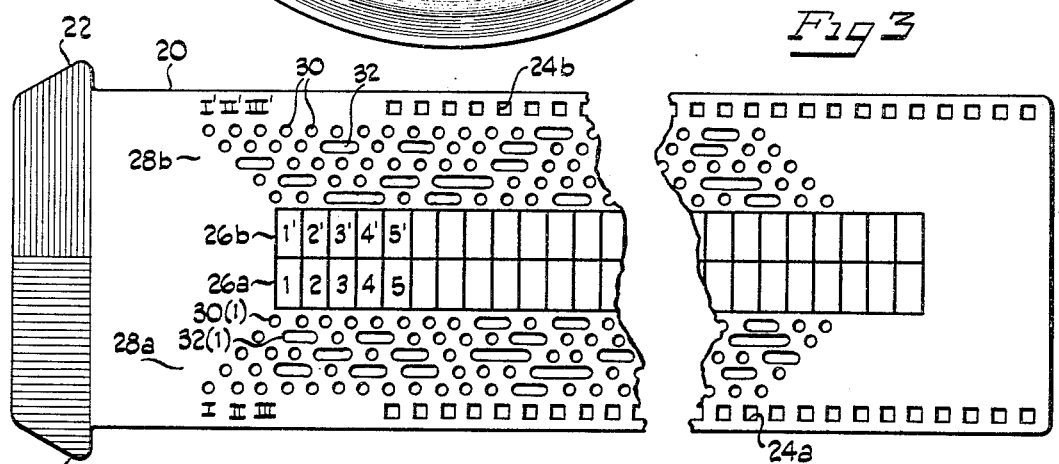
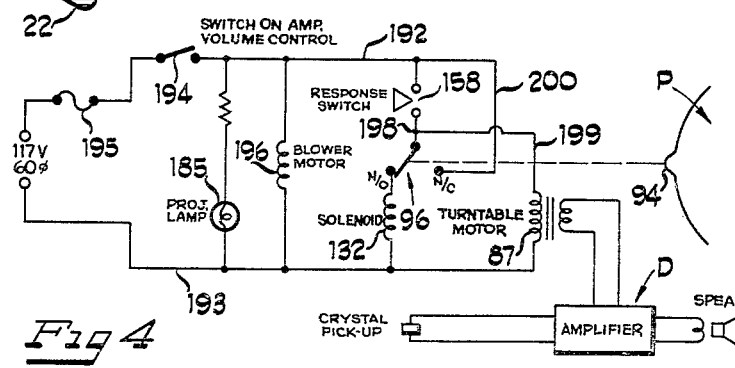
INVENTORS
ALFRED E. GEILS
WILLIAM J. RAYMOND
RICHARD W. ROBERTS
PETER K. SHRECK
BY Thomas B. Hunter
ATTORNEY

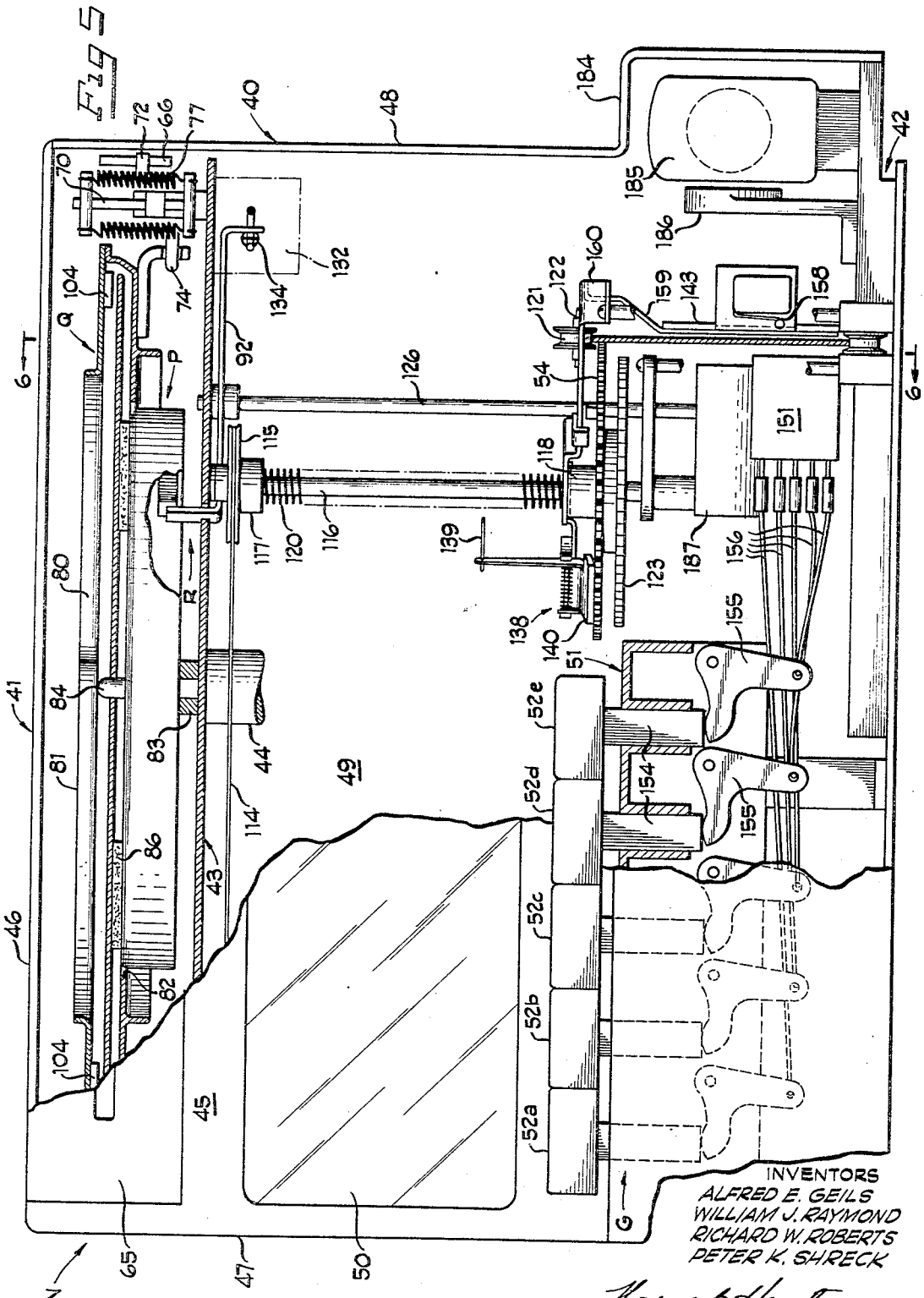

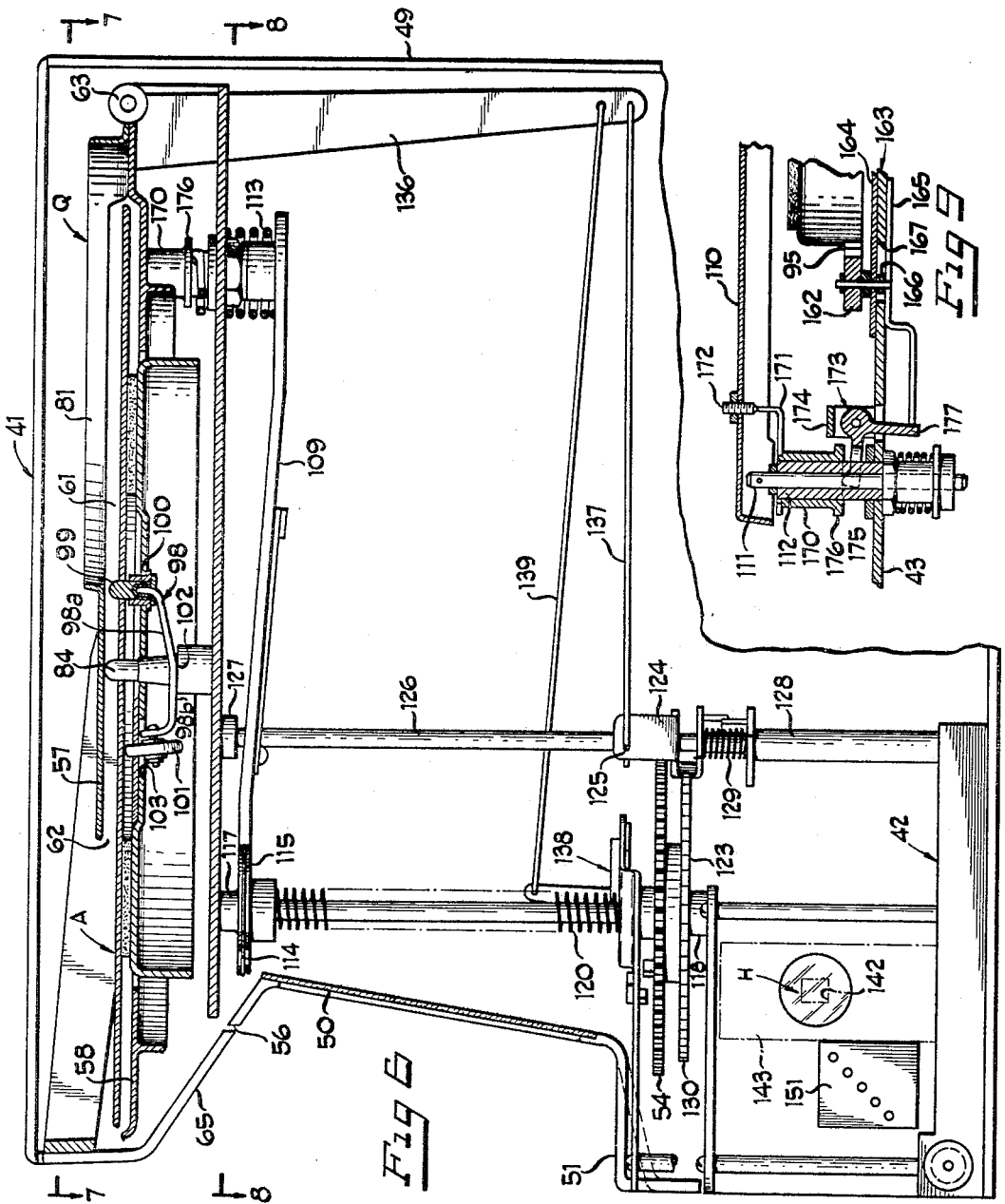

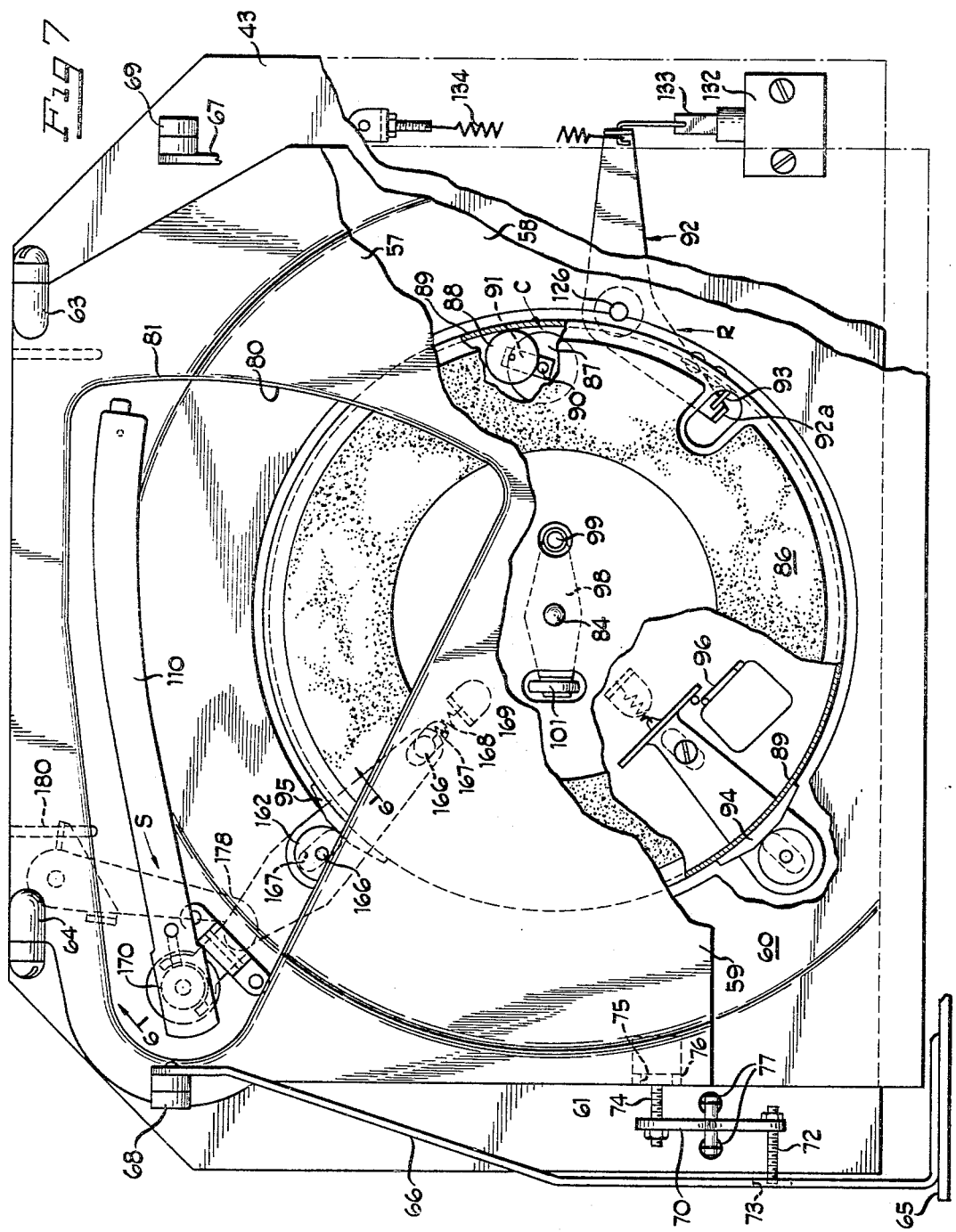

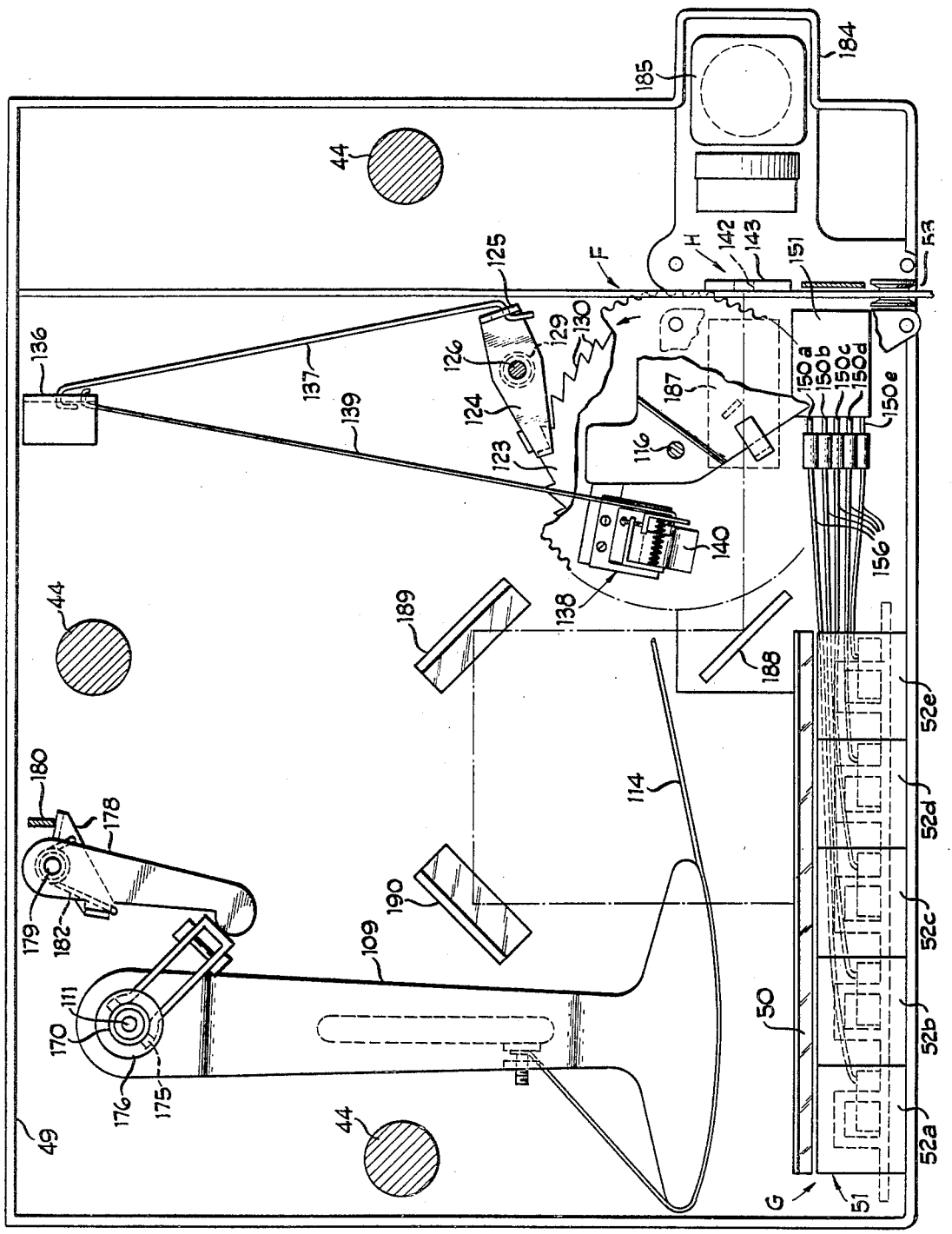

3,483,633
AUDIOVISUAL EDUCATIONAL APPARATUS
Alfred E. Geils, Prospect Heights, William J. Raymond,
Des Plaines, Richard W. Roberts, Lombard, and Peter
K. Shreck, Mount Prospect, Ill., assignors to Borg-
Warner Corporation, Chicago, Ill., a corporation of
Illinois
Filed Feb. 13, 1967, Ser. No. 615,547
Int. Cl. G09b 7/00
U.S. Cl. 35—9                                    12 Claims

ABSTRACT OF THE DISCLOSURE

An audiovisual educational apparatus employing a disc record having audio messages recorded in spaced relationship and film strips mounted on an image carrier. The movement of a tone arm is synchronized with the position of the image carrier so that the images are positively correlated with the audio massages. A response mechanism for registering choices to the questions and/or instructions presented includes a series of pins which are adapted to be selectively inserted through holes or slots in coded sections on the control card to either hold or allow controlled advancement of the card relative to a display station.

SUMMARY AND BACKGROUND OF THE INVENTION

This invention relates generally to educational devices and more particularly to audiovisual teaching apparatus having a response mechanism which the student is required to actuate in response to information or instructions presented aurally and/or visually.

With the heavy emphasis being placed on education in recent years, particularly in the areas of preprimary and primary instruction, there has been a great need for self-tutoring devices which meet the following requirements:

(1) Ability to use low-cost programs to facilitate general acceptance and usage.

(2) Uncomplicated construction for substantially maintenance-free operation.

(3) Ability to be operated by young children with only minimal supervision.

(4) Versatility to permit use of a variety of program formats in different disciplines, such as language arts, mathematics, music, etc.

In the present state of the art, there are very few devices which appear to satisfy the above-listed requirements. On the one hand, there are extremely complex (and costly) instructional devices, such as the O. K. Moore self-tutoring typewriter described in U.S. Patent 3,112,569 and the Uttal system described in U.S. Patent 3,121,960; and on the other hand, there is a variety of relatively low-cost educational devices, most of which are not sufficiently versatile to satisfy the minimum requirements for effective educational tools, particularly with reference to their use by small children. In this latter category, there are devices which merely present audio-visual information in sequential fashion without requiring any response by the operator, such as described in U.S. Patent 3,138,061 and the non-audio, response devices, such as shown for example in U.S. Patent 3,052,041.

Since program costs must be considered in evaluating the over-all usefulness of any particular educational device, one of the most important objectives is to provide a program which contains as much information as possible and which can be manufactured by conventional techniques at low cost. The present invention employs a low-cost, grooved record disc for the audio component and standard (35 mm., 16 mm. or 8 mm.) film strip for the visual component. This particular combination is thus well adapted for conventional mass production methods without having to resort to more specialized and sophisticated technology.

The basic concept to be described in more detail below resides in the combination of: (1) an audio component comprising a plurality of spaced audio messages recorded on a suitable medium, (2) a responder mechanism which is operated by the student to register his response to information and/or questions presented in the program; (3) a combined programming means and visual component including: (a) visual images corresponding to the audio messages and (b) code means cooperating with the responder mechanism which selectively holds or permits a controlled advance of the program depending on the particular response; and (4) an audio reproduction system including an audio pick-up cooperating with said audio component and adapted to select and reproduce individual messages to correspond with the images.

Positive synchronization between the audio and the visual components is assured by coordinating the position of an audio pick-up relative to the record with the position of the images relative to a display station. Selective advancement of the combined programming means and visual component (referred to hereinafter as the control card) is effected, in turn, by mechanical cooperation between the responder mechanism and the code means carried by the control card. During normal operation of the apparatus, a correct response will allow the control card to index to the next position so that an adjacent image is located at the display station; but an incorrect response will prevent advance and will repeat the audio message. Moreover, the code means may be modified to provide program "branching," i.e. the pre-programming of supplementary information which is presented when an incorrect response choice is made by the student. This supplementary information is by-passed by advancing the con trol card more than one space if a correct response choice is registered. The apparatus also contains a number of additional features which may be utilized on other types of audio and/or visual devices and which may not necessarily require a response mechanism.

It is, therefore, a principal object of the invention to provide an improved audiovisual educational apparatus.

Another object of the invention is to assure positive synchronization between the audio component and the visual component in an audiovisual apparatus so that the images and audio messages always correspond, even during rapid scan of the program.

Another object of the invention is to provide an educational device which permits "branching" during a program to provide supplemental information to the student in case of an incorrect response.

Another object of the invention is to provide an audio-visual apparatus adapted to use programs which can be manufactured at relatively low cost.

Another object of the invention is to provide a program in which opposite sides of both the audio and the visual components can be used to store information with the corresponding sides being color coded to give the operator a visual stimulus for proper coordination.

Another object of the invention is to provide an improved audio record which allows large tolerances in the audio pick-up locating and track (message) selection mechanism.

Another object is to provide an improved mechanism for positioning a disc record onto a turntable.

Still another object of the invention is to provide a simplified control system which will repeat a message in the case of an incorrect response choice and will automatically advance the program upon a correct response choice.

Additional objects and advantages will be apparent from the following detailed description in conjunction with the drawings wherein:

FIGURE 1 is a pictorial or schematic representation of the principal components in the apparatus;

FIGURE 2 is a plan view of the audio component;

FIGURE 3 is a plan view of the combination visual component and coding element, sometimes referred to as the control card;

FIGURE 4 is a schematic diagram of the control circuit;

FIGURE 5 is a front elevation view, partly broken away and in cross section, of a preferred embodiment of the invention;

FIGURE 6 is a cross section taken along the plane of line 6—6 of FIGURE 5;

FIGURE 7 is a cross section taken along the plane of line 7—7 of FIGURE 6;

FIGURE 8 is a cross section taken along the plane of line 8—8 of FIGURE 6;

FIGURE 9 is a detailed cross section illustrating the mechanism for controlling the vertical movement of the tone arm; and FIGURE 10 is a detailed cross section view showing the pin guide and support assembly.

Before beginning a description of the actual construction and operation of the device, it should be pointed out that there are many different alternative arrangements which will be obvious to anyone skilled in the recording and optical art. Consequently, the various terms used herein, such as "audio pick-up," are intended to cover a wide variety of electrical, mechanical and optical means for translating recorded information into aurally sensible information to the operation. For example, in the disc recording art, there are at least four main types of audio pick-ups, e.g. ceramic, magnetic, crystal and pure mechanical. Obviously, the choice of one or the other of these pick-ups would be governed by considerations of a trade off between the quality of reproduction desired and cost.

To guide those skilled in the art in selection of various equivalents, the following glossary is provided to define the various terms used frequently throughout the specification and claims herein. It should be understood that this is primarily for the purpose of facilitating a complete understanding of the invention, and it is not intended that the terms be strictly limited to the specific definitions recited.

Program

Any intelligence, regardless of the purpose for which such intelligence is to be employed, e.g. educational, intructional, or entertainment, for communication to the operator, said intelligence being capable of being divided into a predetermined number of discrete segments for presentation to the operator in a non-random fashion. The term "discrete segments" is not to be limited to a single visual image presented in conjunction with a single audio message, but may also include more than one audio message corresponding to a single visual image or more than one visual image corresponding to a single audio message.

Image

Any pictorial representation, symbol, written matter, alone or in combination with each other, for communicating intelligence to the operator through his visual senses.

Audio component of program

Any suitable medium having one or more messages recorded thereon by any means, such as optical, magnetic, or embossed recording techniques. The record medium may take many forms but the most common would be the disc-type record, a cylindrical drum, or a flexible belt of the type used in dictating apparatus. If magnetic recording techniques are employed, the recording media may be any suitable support for a magnetic iron oxide coating.

Audio message

The audio message is any meaningful intelligence which is capable of being recorded and reproduced by an appropriate audio reproduction system including a pickup.

Audio reproduction system

Any means which is adapted to cooperate with the audio component of the program unit to convert the recorded messages into intelligence capable of being understood by the operator through his aural senses. In a conventional system, this would include an audio pick-up of a type capable of deriving a signal from the particular form of recorded audio information; and an amplifier to amplify the signal generated by the pickup to power level which can drive a transducer, such as a loudspeaker, to convert the amplified signal to an audible signal. This would also include simple mechanical systems for direct conversion of the recorded information into sound, e.g. a diaphragm mechanically connected to a record stylus.

Visual component of program

The combination of a plurality of discrete images adapted to be selectively presented to the operator and means for supporting the images in a predetermined pattern.

Responder mechanism

Any device capable of being used to register a response by the operator. The response may be cued by direct instructions, thereby omitting a choice, or by posing a question which may be answered by selection of various alternatives.

Code

Any means for distinguishing a correct response from an incorrect response for coordinating the registered response with the advance of the program so that the selection of an incorrect response produces one result and the selection of a correct choice produces another result.

Visual display station

A discrete point or location with respect to which the visual intelligence is brought into some predetermined spatial relationship so that such intelligence is communicated to the operator. The images may be viewed directly at the display station or projected from the display station to another location for viewing.

GENERAL DESCRIPTION

Referring first to FIGURE 1, which is a schematic or pictorial representation of the main functional components in the system, the instructional program is comprised of an audio component A and a visual component B. The audio component is preferably in the form of a record disc or platter adapted to be supported on a turntable which is driven by drive means C. An audio reproduction system D, including a movable audio pick-up is adapted to select and play back different recorded messages on the record which correspond to images in the visual component.

The visual component B, comprising a series of individual images, is integrated with a code E on a suitable support. For convenience, the support which carries both the images and the code will be referred to hereinafter as the control card and designated at F. A responder mechanism G which is used by the operator to register responses to instructions and/or questions presented in the program is adapted to coact with code means E for selectively holding or allowing controlled advance of the control card F.

Movement of the control card F with respect to a display station H is positively synchronized with the movement of the audio pick-up for selection of a particular recorded message thereon to correspond to the image appearing at the display station; and although the images could be presented for direct viewing at the display station, it is more practical to project them to a different location through an optical system J. Program advance mechanism K cooperates with means L for effecting relative movement between the control card and the display station H, said means including a sprocket wheel for engaging the control card to constitute a form of rack and pinion drive system.

THE AUDIO COMPONENT

A plan view of the audio component A is illustrated in FIGURE 2. In the preferred embodiment, this takes the form of a disc-type, grooved record in which the various messages are recorded in a continuous spiral path and arranged in concentric groups. The record platter 10 is provided with a central opening 12 for reception of the center spindle on the turntable and a locating hole 14 spaced radially from the axis of rotation. In the operation of the unit, each individual message begins and ends by the time a single revolution of the record has been completed. In other words, the record (and the turntable must always return to a central or "home" position in preparation for the next message. This message start (and finish) position is indicated by a dotted line 16 following the arcuate travel path of the audio pick-up.

An important feature of the invention is a system of recording the messages to permit considerable latitude in locating the audio pick-up when it drops onto the record. This is accomplished by recording identical messages within the same band. To illustrate, the bands at 18a, 18b, etc., each consist of a plurality of identical messages—10 to 30—recorded in adjacent tracks. The pick-up stylus can therefore be dropped anywhere within the band and still play back the correct message when the turntable is driven through its single revolution. The next message, recorded in an adjacent band, is reproduced by shifting the pick-up radially and dropping it anywhere within said band. It should be understood that a particular message need not take up the entire space available within the one revolution track; but each of the identical messages recorded within a given band will normally begin and end at the same radial location.

CONTROL CARD

The control card combines several functions: (1) a support for the visual images; (2) means forming an essential part of the synchronization mechanism; and (3) a means for incorporating the code, which in cooperation with the responder mechanism, determines the frame-to-frame advance of the program. As shown in FIGURE 3 the control card F is in the form of an elongated, generally rectangular paddle 20 having projections 22 at one end to function as a stop for locating the card when it is placed in an operative position with respect to the display station. The programs are divided into two sections so that one set of images corresponds to the messages recorded on opposite sides of the record. The control card and record are then inverted after the first section of the program has been completed. Accordingly, each functional element associated with the control card is one of a pair.

Along the upper and lower edges of the control card are lines of sprocket holes 24a, 24b which cooperate with the program advance mechanism to provide indexing movement to the card during operation of the machine. The images are arranged on opposite sides of the card center line, preferably in the form of a pair of film strips 26a, 26b which may be standard (35 mm., 16 mm. or 8 mm.) film adapted for through projection onto a display screen.

Two coded areas 28a, 28b are located between the sprocket holes and the film strips. The code comprises a plurality of aperture groups, the number of groups being equal (with certain exceptions) to the number of images in each film strip, and the number of apertures in each group being equal to the number of response keys in the responder mechanism. It will be noted that certain of the apertures are circuar (holes) and others are elongated (slots). Actuation of the responder mechanism selectively inserts a pin or other means for interfering with card movement through one of the holes or slots. When one of the pins is in a hole 30 the card cannot be moved; but when it is in a slot 32 the card can travel a distance equal to the length of the slot. The specific coaction between the code and the responder will be discussed in more detail below.

CONSTRUCTION OF AUDIO-VISUAL DEVICE

The construction of a preferred embodiment of the audiovisual apparatus adapted to use the program components described above is shown in FIGURES 4 to 11. As an aid to a complete understanding of the invention, the following description will be organized in three main parts: (1) a general description of the housing and the location of the principal components within the housing; (2) a detailed description of the various subassemblies; and (3) a description of the operation.

HOUSING

A main housing, generally designated at N, comprises a rigid frame 40 for supporting the operating mechanism and an external appearance cover 41 to enclose such mechanism and the record-control card components of the program during operation of the device. The frame includes a base 42 and a platform 43 attached to the base and spaced therefrom by a plurality of legs 44. The appearance cover 41 comprises a front wall 45, top wall 46, side walls 47, 48 and a rear wall 49.

The upper part of the housing N contains a turntable assembly P carried by the platform and a record tray assembly Q. A rear projection display screen 50 is located on the front wall of the housing for convenient viewing of the images by the operator; and immediately underneath the screen is the responder mechanism G which includes a console 51 with a set of response keys 52a, 52b, 52c, 52d, 52e adapted to be manipulated by the student to register his responses to questions and/or instructions in the program.

At the lower right hand portion of the front wall 45 is a vertical slot 53 which is adapted to receive the control card F. As the control card is inserted into the slot, the sprocket holes 24a(b) along the edge engage and receive the teeth on a sprocket wheel 54 which cooperates with a tone arm position control mechanism to synchronize the audio messages with the images in registration with the display station H.

THE TURNTABLE AND RECORD TRAY ASSEMBLIES

The upper portion of the front wall of the housing N is provided with an access opening 56 to permit removal (and insertion) of the record from the turntable P. To facilitate this manipulation, a record tray assembly Q is provided, said record tray being operative to automatically locate the record with respect to the center spindle on the turntable. The tray is also mounted for pivotal movement so that it may be lifted clear of the center spindle (and a locating pin) and the tone arm during any transfer of a record onto or off the turntable.

As shown best in FIGURES 5, 6 and 7, the tray comprises upper and lower parts 57, 58 joined on three sides and dished in the center at 59, 60 to define a generally circular pocket 61 for the reception of the record. The open side 62 of the tray faces the front of the housing and is generally aligned with the access opening. The entire tray is pivoted on a pair of brackets 63, 64 attached to the platform at the rear of the housing.

The front end of the tray is adapted to be lifted to allow the record to clear the turntable and the tone arm at the same time that a closure for the access opening is shifted from a closed position to an open position. It will be noted that the closure 65 is supported at the end of two elongated arms 66, 67 pivotally supported on the platform at 68, 69. The lifting action is accomplished by the use of a pair of bi-stable rocker links 70 (only the left-hand link being shown) attached to the platform on opposite sides of the tray. A first pin 72, secured to the front end of the link, extends through a slot 73 in the arm 66. Another pin 74 at the opposite end of each link extends through a slot 75 in a bracket 76 attached to the tray. When the closure (and the arms) are pushed down to the open position, each link pivots in such a way that the tray is lifted. A pair of springs 77 holds the closure in the open and closed positions by an over-centering (locking) action.

The upper section of the tray is formed with a large wedge-shaped opening 80 defined by an upstanding reinforcing rib 81. This opening permits clearance for the tone arm as it swings in its normal arcuate path across the record. The bottom section of the tray has a large, circular opening 82 with a diameter slightly larger than the turntable, but smaller than the diameter of the record so that it can support it at its periphery while loading and unloading.

The turntable P is supported in a bearing 83 mounted on platform 43 and has a center spindle 84 extending above the plane of the upper surface thereof. A cushion 86 may be provided on the upper surface to prevent damage to the record when dropped onto the turntable and also to prevent slippage between the turntable and the record. Although any conventional turntable drive system may be used, the drive means C (see FIGURE 7) comprises an electric motor 87 and a friction drive roller 88 engaging the rim 89 of the turntable. The respective diameters of the motor shaft 90 and the turntable rim 89 are selected so that the turntable is driven at about 15–20 r.p.m. (preferably at 16⅔ r.p.m.) to give satisfactory audio reproduction and a message length of up to three to four seconds. The drive roller 88, mounted on bracket 91, is spring loaded (by means not shown) into driving engagement with both the shaft and the rim.

As pointed out above, each audio message is completed within a single revolution of the record. In order to control the movement of the turntable, a turntable stop is provided which is adapted to arrest the turntable at a predetermined point after a single revolution and prevent further movement until the stop is released. The stop mechanism, designated generally at R, comprises a bell crank lever 92 having an arm 92a engageable with a radially inwardly extending tab 93 secured to the turntable rim 89. The actuation of the stop will be discussed in more detail below in connection with the control system.

Additional control features associated with the turntable include a pair of cams 94 and 95 which respectively operate a micro-switch 96 in the control circuit and a tone arm lift mechanism S. The two cams are located at different levels with respect to the turntable rim so that actuation of their respective cam followers is selective.

A novel aspect of the invention is the particular locating mechanism which assures accurate placement of the record onto the turntable. Since all the messages begin and end at a particular point on the record (indicated at 16 on FIGURE 2), it is necessary to make sure that the program is started with the record properly aligned with respect to the turntable. This is accomplished by means of a locating mechanism, designated at T, which will hold the record stationary until a locating pin on the turntable finds the corresponding locating hole 14 on the record. As best shown in FIGURE 6, a U-shaped bracket 98 having arms 98a, 98b extending upwardly is carried on the center spindle 84 and rotatable with the turntable. A locating pin 99 on one arm 98a is adapted to project through a ferrule 100 in the turntable and the locating hole 14 in the record. Arm 98b carries record engaging means in the form of a roller 101 journalled for rotation along axis normal to the center spindle. The shape of bracket 98 is such that when one arm is at or below the plane of the record, the other arm will project above the plane of the record with the pivot point 102 being below said plane and approximately on the rotational axis of said record. When the tray is lowered with the record, the tray pocket 61 will hold the record so that the center hole 12 will be aligned with the spindle 84. Normally, the locating hole 14 will *not* be aligned with the locating pin; and since the locating pin cannot project through the locating hole, the bottom of the record will engage and bear down on the top of pin and rock the bracket so that the roller is pushed up through an opening 103 in the turntable. This will prevent the record from dropping onto the turntable surface and urge the uper surface of the record into engaement with friction pads 104 attached to the lower surface of tray section 57.

When the turntable is then rotated, the record will remain stationary; but the roller and the locating pin will rotate with the turntable until the pin can find opening 14 and seat itself therein. When this occurs, the roller will drop down through opening 103 as the bracket rocks in the opposite direction; and the record will drop flat onto the turntable surface in the proper, aligned relation.

SYNCHRONIZATION—TONE ARM LATERAL CONTROL

The tone arm 110 is mounted for horizontal or lateral movement on a shaft 111 located at the left-rear portion of the housing and journalled in a bearing 112 attached to the platform 43. A torsion spring 113, anchored to the platform and the shaft, biases the tone arm in a clockwise direction (as viewed in FIGURE 7) to the innermost position. As best shown in FIGURES 6 and 8, lateral movement of the tone arm is linked to the movement of the control card by means of an elongated lever 109 extending from the tone arm shaft toward the front wall. This lever is connected by means of a cable, chain, or other suitable means 114 to a drum 115 attached to and rotatable with the sprocket wheel shaft 116, said shaft being mounted in upper and lower bearings 117, 118 on the platform and base respectively.

The cable 114 is always maintained in tension by the opposing forces of spring 113 biasing the tone arm and a power spring 120 adapted to drive the sprocket wheel shaft 116 in a clockwise direction (as viewed in FIGURE 8). When the control card is inserted into the machine, it drives the sprocket wheel 54 in the direction shown by the arrow (FIGURE 8). This will drive the drum 115 in a direction which will unwind the cable and permit spring 113 to move the tone arm toward its radially innermost position. As the card moves outwardly in indexing-type movement, drum 115 is rotated in a direction which winds up the cable on the drum and pulls lever 109 in a direction which effects movement of the tone arm radially outwardly. The sprocket wheel 54, the cable 114, and the tone arm lever 109 thus function as a positioning means which is adapted to provide positive, incremental movement between the audio pick-up and the phonograph record in response to a corresponding incremental movement of the control card which carries the images. This mechanical linking of the visual and audio components assures absolute synchronization.

PROGRAM ADVANCE—CONTROL CARD GUIDE AND DISPLAY STATION

As the leading end of the control card F is inserted into the slot 32, the lower edge is engaged and guided by a pair of rollers 106 mounted on the base 142. At the same time, the top edge of the card will be engaged and guided by a roller 121 which is carried on the end of the cantilever spring 122. The spring action thus keeps the card in perfect alignment throughout its entire length of travel.

Indexing movement of the card is effected by cooperation between power spring 120, the sprocket wheel 54, a ratchet wheel 123 carried on the spocket wheel shaft, and a pawl 124. The pawl is secured to a rotatable shaft 126 journalled at its upper end in a bearing 127 on the platform and at its lower end in a bearing 128 attached to the base. A torsion spring 129 urges the pawl into engagement with the ratchet teeth 130 but permits one-way movement of the sprocket wheel when the control card is inserted. Suitable stops (not shown) arrest the sprocket wheel at predetermined points so that synchronization is maintained.

Release of the ratchet (and sprocket) is effected by actuation of a solenoid 132 mounted underneath the platform. As best shown in FIGURE 7, actuating rod 133 of solenoid 132 is connected to one end of the turntable stop arm or lever 92 which is also supported by the pawl shaft 126. A return spring 134 for the brake lever 92 is anchored to the platform at 135. Energization of the solenoid will thrust the stop lever and shaft 126 in a clockwise direction (as viewed in FIGURE 7) to release the pawl 124 from the ratchet wheel 123. This will permit the card to advance, due to the driving force of spring 120, in a direction out of the housing unless interfered with by the pins cooperating with the coded area on the card. It should be pointed out that the force delivered by the sprocket wheel spring 120 is much greater than the force provided by the tone arm spring 113. Accordingly, the former will always override the latter, even though the forces are applied in opposite directions through the cable 114.

When the control card has reached its terminal frame or image, it may be released for removal from the slot 32 by a second control linkage connected to the record tray Q. As shown in FIGURES 6 and 8, the back of the tray has a downwardly extending arm 136 which is connected to the ratchet pawl 124 through a strut 137. One end of the strut extends through a slot 125 in the pawl to provide a lost motion connection permitting the pawl to be intermittently actuated by the solenoid without exerting a force on arm 136. However, when the tray pivots upwardly to permit removal of the record, the arm and strut linkage pushes the pawl to a full release position which permits the card to be removed. To prevent the spring 120 from rapidly driving the card out of the slot when the tray is lifted, a brake mechanism for the sprocket wheel, generally indicated at 138, is provided.

A second strut 139 attached to arm 136 pivots a brake pad 140 to engage the upper surface of sprocket wheel 119 at the same time that the pawl is released. The braking effort applied is not so great as to hinder removal of the control card from the housing.

The display station H is a particular location with respect to which the individual images on the control card are brought into some predetermined spatial relationship to permit the operator to view or otherwise receive the visual intelligence carried on said image. In the apparatus described, this display station may be regarded as coincident with the aperture 142 in a mask 143 forming a part of the optical projection system; although it should be understood that the images may be presented for direct viewing.

RESPONDER MECHANISM

As pointed out above, movement of the control card is governed by cooperation between the holes and slots in the coded area of the card and a series of interfering pins selectively insertable through one of the holes and slots associated with each image. The pins 150a, 150b, 150c, 150d, 150e are mounted in a pin guide and support assembly 151 (see FIGURE 10) and include springs 152 to hold the pins away from the card unless forced, by actuation of a key, in a direction to overcome the spring force.

Attached to the frame on the front of the housing is the console 51 which includes a support member 153 having openings to receive the stems 154 extending from the response keys 52a–52e. Downward pressure on any of the keys forces the end of the stem into engagement with one of a plurality of bell crank levers 155 attached to support 153. The opposite end of each lever is connected to the respective pins 150a–150e through struts 156. Adjacent to the display station H, on the opposite side of the control card from the pin guide and support assembly 151 is a micro-switch 158. The micro-switch actuating mechanism includes a flexible plate 159 attached to a part of the frame at 160. The plate has a portion which is arranged to cover the area through which the pins can project on the opposite side of the control card. Accordingly, the actuation of any key will effect engagement of the plate 159 by the corresponding pin to close the micro-switch. The operation of the micro-switch will be discused in more detail with regard to the operation of the control circuit.

TONE ARM—VERTICAL CONTROL

The vertical position of the tone arm 110 is coordinated with the turntable P by means of tone arm lift mechanism S, such that: (1) the pick-up (and stylus) is dropped onto the record just after a revolution of the turntable is initiated; and (2) the pick-up is lifted off the record each time the turntable ends one revolution. Means are also provided for raising the tone arm to a still higher elevation when the record tray Q is pivoted up to change a record in order to prevent interference between the tone arm and the record during this operation.

As best shown in FIGURE 9, the tone arm lift mechanism S includes a cam follower 162 which cooperates with the cam 95 on the turntable to actuate a slider 163 mounted on platform 43. The slider is constructed of two plates 164, 165 on opposite sides of the platform, said plates being attached to each other by pins 166, which extend through slots 167. The slider is thus restricted to limited travel back and forth on a radial path which extends between the turntable axis and the tone arm (lateral) pivot axis. A return spring 168, attached to the slider and a tab 169 on the platform, biases the slider against the turntable rim.

A sleeve 170 is journalled on the O.D. of the tone arm shaft bearing 112 extending above the platform 43. Attached to the upper end of the sleeve is an L-shaped arm 171 which has a terminal portion adapted to engage the underside of the tone arm 110. In a preferred embodiment, contact is made with an adjustment screw 172 which may be used to make minor adjustments in the height of the tone arm. To complete the linkage between the tone arm and the turntable cam, a lever 173 is pivoted on a bracket 174 mounted on the platform, said lever having a fork-shaped arm 175 engaging a flange 176 on the bottom of sleeve 170 and another arm 177 extending downwardly for engagement by the bottom slider plate 165. Since the tone arm has a generally channel-shaped cross section to receive the end of arm 171, and since the sleeve is freely journalled on the outside of the tone arm shaft bearing 112, the sleeve will rotate with the tone arm during its travel back and forth laterally.

In order to lift the tone arm to a maximum elevation to prevent damage during insertion or removal of the record, a two-piece lever 178 is pivoted on a pin 179 extending down from the platform. This lever is adapted to be actuated by means of an arm 180 attached to and extending downwardly from the back of the record tray Q so that when the tray is lifted, lever 178 is pivoted in a clockwise direction, as shown in FIGURE 8, to engage and move arm 177 of the tone arm lift lever. The maximum movement of this lever is greater than that effected by the movement of the slider mechanism so that the tone arm is lifted still further. The mechanical advantage in this linkage is enough to lift the far end of the tone arm against the inside of the top cover 41. The torsion spring 182 connecting the two sections of lever 178 takes up any additional movement in winding up the spring.

OPTICAL SYSTEM

The optical system J to be described is more or less conventional for use with transparency projection. An extension 184 of the main housing provides space for the projection lamp 185 and a blower if required (not shown). The heat resistant glass and condensing lens assembly 186 is supported between the lamp and the mask 143 and aperture 142 which confines the light path to an area corresponding to the individual images on the control card. On the opposite side of the display station H is a projection lens 187 which projects the image through a mirror system onto the rear projection display screen 50 on the front of the housing. The location of the various mirrors in the optical system is governed largely by the placement of other components in the housing. However, in the particular device shown, a first 45° mirror 188 projects the image toward the back wall along a plane parallel to the base. A second mirror 189 reflects the image at a 90° angle in a plane parallel to the back wall and at approximtely a 45° angle upwardly onto a third mirror 190 which redirects the image onto the display screen at a 90° angle toward the front and approximately parallel to the base.

CONTROL CIRCUIT

Referring now to FIGURE 4, the control circuit for automatically controlling the sequence of operations is illustated in schematic form. A pair of line conductors 192 and 193 are connected to a conventional power source, i.e., 117 volt 60 cycle A.C. through a main on/off switch 194 and fuse 195. The on/off switch 194 may also be combined with a volume control for the audio reproduction system D. Lines 192, 193 supply electrical energy to the projection lamp 185 and a blower motor 196 when the main switch is closed. Micro-switch 158, which is actuated by any of the response keys, is in series with the cam actuated switch 96 and solenoid 132. The turntable motor is connected between power line 193 and a terminal 198, which is in common with switches 96 and 158, by conductor 199. With the turntable P in the position shown, micro-switch 96 is placed with the N/O contact in the closed position and the N/C contact in the open position to enable solenoid 132 to be energized when micro-switch 158 is closed by depression of any one of the keys 52a, 52b, etc. This will also complete a circuit through switch 158, conductor 199 and the turntable motor 87 to begin rotation of the turntable and dislodge the cam 94 from the corresponding cam follower controlling switch 96. As soon as the turntable cam 94 has left its "home" position, micro-switch 96 opens contact N/O and closes contact N/C. This will, of course, de-energize the solenoid and at the same time close an alternate circuit through the turntable motor through conductor 200 which is in parallel with micro-switch 158. The turntable will continue to rotate until the cam again reaches its home position at which time the N/C contact will open to discontinue power to the motor and will close contact N/O to condition the solenoid for the next depression of the response switch.

OPERATION

Having thus far described the mechanical construction of a preferred embodiment of the apparatus, the following table outlines the various steps in the control sequence and the corresponding effect with regard to the various components:

Action 1.—Closure moved to "open" position

Effects:

(a) record tray lifted (b) tone arm lifted to highest position (c) pawl released (d) sprocket wheel brake engaged Action 2.—Record inserted into tray Action 3.—Closure moved to "closed" position Effects:

(a) record tray drops—record held off turntable and against friction pads by roller (b) tone arm dropped to intermediate position (c) pawl engaged (d) sprocket wheel brake disengaged Action 4.—Control card inserted Effects:

(a) tone arm pivoted radially inwardly as sprocket wheel is driven by control card (b) when fully inserted, image No. 1 is displayed on screen and stylus is just inside band with first recorded message.

Action 5.—Student responds to audio-visual information and depresses response key Effects:

(a) one of the pins 150a, 150b, etc., is thrust through a slot (or hole) in the control card to actuate micro-switch 158

(b) circuit to solenoid completed and solenoid energized (i) solenoid retracts to release pawl with respect to the sprocket and permit control card to advance (if it can)

(ii) turntable stop released (c) turntable motor energized (d) if pin is in one of the holes 30, control card remains stationary and tone arm does not move to next message group. If pin is received in one of the slots 32, control card advances until it is arrested by back edge of slot to bring new image into display station and advance the tone arm to corresponding message.

Action 6.—Turntable begins revolution

Effects:

(a) cam 95 actuates tone arm vertical control mechanism S and drops tone arm onto record (b) cam 94 actuates micro-switch 96 which:

(i) opens circuit to de-energize solenoid, bringing pawl and turntable stop back to initial position and (ii) closes parallel circuit through turntable motor to continue turntable rotation.

Action 7.—During turntable rotation

Effect:

(a) locating pin 99 finds locating hole 14 in record and record drops down on turntable surface in correct position.

Action 8.—Turntable returns to home position

Effects:

(a) cam 95 actuates tone arm vertical control mechanism S to lift tone arm off record (b) cam 94 opens N/C contacts of switch 96 to discontinue turntable motor and recloses contacts N/O to condition solenoid for next key actuation through switch 158

(c) turntable stop 92–93 arrests turntable in home position

Action 9.—Continue through program by repeating actions 5 to 8

Action 10.—Program change (last frame on control card)—closure moved to open position Effects:
(a) record tray lifted
(b) tone arm raised to maximum elevation
(c) pawl moved to full release position
(d) sprocket wheel brake engaged to prevent rapid ejection of control card Action 11.—Record and control card removed and inserted back in inverted position Action 12.—Repeat actions 5 to 9 until program completed

CONTROL CARD CODING—BRANCHING

Referring back to FIGURE 3, it will be noted that the code apertures may be conveniently arranged in groups with the left-hand edge of all holes or slots in a group lying along an imaginary straight line. These imaginary lines are all parallel and may be canted at an angle to the edge of the card.

As pointed out above in the discussion on the control card, each aperture group I, II, III etc. corresponds to one of the images designated 1, 2, 3 . . . etc.; and when the card is inverted, aperture groups I', II', III', etc. correspond to images 1', 2', 3', etc. When the operator begins the program, image 1 will be at the display station for projection onto screen 50 and the pins 150a, 150b . . . 150e will be aligned with the holes (or slots) in the code group I. The first group is a dummy to allow the record to seat itself properly on the turntable. Therefore, no audio message is required. To avoid wasting one frame, the student may be instructed (by information on image 1, for example) to first push the left-hand key 52a which will result in pin 150a projecting through a hole 30(1). This will initiate the first complete revolution of the turntable to seat the record; and there would be no audio message for this image.

With the record properly seated on the turntable, the student is now prepared to continue with the regular program; so he is instructed to depress another key, e.g. 52c, which projects pin 150b through a slot 32(1). The solenoid 132 is actuated by the closing of switch 158 and the card advances to image 2. At the same time, the audio pick-up head is dropped on the band which has the first message recorded thereon.

By way of example, image 2 may depict the letter "B" and have an arrow pointing to one of the keys. The audio message may state—

"This is the letter B (pronounce phonetically)—now push the key under the arrow."

The response is thus made to a pure instruction by depressing the key under the arrow. When this occurs, the control card advances to image 3 (and the audio message corresponding thereto).

This frame may be constructed as follows:

IMAGE—Series of different letters (including one "B") each arranged over one of the keys
AUDIO—"Can you find the letter B? Press the key under B!"

In this example, the code for the key corresponding to the letter B is the only one which has a slot to advance the control card. Depression of other "incorrect" keys will insert a pin through a hole, and will repeat the audio message without advancing the program.

In a branched program both a correct and an incorrect answer will advance the program; but in the case of an incorrect answer, the next frame will supply additional information and a correct answer will advance the program two (or more) frames to bypass the additional information.

As an example, it will be assumed that the previous question (find the letter "B") has been presented on image 3 (and the corresponding audio message).

All the incorrect choices will advance the program to frame 4 by means of a single frame slot. This frame will be constructed as follows:

IMAGE—Letter B appearing again with other letters which are designated as being incorrect
AUDIO—"You did *not* select B—depress the key under B."

If a correct choice was made earlier, then the program skips frame 4 and advances by means of a double frame advance slot to frame 5. Frame 5 would normally be used to introduce new information.

Frame 4 may thus be regarded as comprising an error stimulus which includes both an audio error message and an error image.

In a more sophisticated program, multiple branching may be employed. In this case there may be as many different error stimuli as there are incorrect choices to a particular question. Continuing with the example above, instead of a general error stimulus as specified for frame 4, each incorrect response may advance the control card to a different position. For example, the choices in addition to "B" may be "F," "D," "P" and "E" which correspond to keys 52a, 52b, 52d and 52e, respectively. Actuation of key 52a will advance the control card to frame 4 which may be constructed as follows:

IMAGE—B F̶
AUDIO—"You selected F not B. Now that you see the difference, push the key under the B."

Actuation of key 52b will advance the control card to frame 5 which would be constructed as follows:

IMAGE—B D̶
AUDIO—"You selected D not B. Now that you see the difference, push the key under the B."

Actuation of keys 52d or 52e will shift the card to frames 6 and 7 respectively, which would also be specific error stimuli. The actuation of key 52c, the *correct key,* would advance the program to frame 8 which would normally be a new informational frame.

The above examples are intended to demonstrate the versatility of the present invention and will suggest to those skilled in the art a large number of possible variations.

Since the program is constructed so that each side of the record 10 corresponds, respectively, to the two lines of images 26a and 26b on the control card, some means must be provided for coordinating the loading of the record and the control card to prevent a mismatch. A special problem exists in the situation where the apparatus is to be operated by young children and others unable to read information which might be applied to the record and the control card to assure proper coordination. A preferred way of avoiding this problem is to color code both the record and the control card. Referring to FIGURES 2 and 3, the center section of the record is provided with a label 202 which is color coded with the projecting end of the control card F. The color of this code label 202 is thus matched with one section 203 of the control card and the other side of the record has a corresponding code label (not shown) which is colored to match the other coded section 204 of the control card. When the record is loaded into the apparatus and the control card inserted in the corresponding slot so that the color of both the label and the control card are both facing in the same direction (up or down), there can be no mismatch of the audio and visual components.

While this invention has been described in connection with a certain specific embodiment thereof, it is to be understood that this is by way of illustration and not by way of limitation; and the scope of the appended claims should be construed as broadly as the prior art will permit.

What is claimed is:

1. An audiovisual educational system comprising: an audio record having messages recorded thereon in a predetermined pattern; an audio reproduction system including an audio pick-up for said audio record; means for effecting relative movement between said audio pick-up and said audio record to select individual messages; an integrated control and visual component including a plurality of visual images corresponding to said audio messages; means defining a visual display station with respect to which the images are selectively brought into some predetermined spatial relationship for viewing by the operator; means for effecting relative movement between said control and visual component and said display station; code means operatively associated with said control and visual component; synchronization means positively coordinating relative movement between the audio record and said audio pick-up with relative movement between said images and said display station, said synchronization means including positioning means responsive to the position of said control and visual component mechanically linking said control and visual component with said pick-up head, said positioning means being adapted to provide a positive, incremental relative movement between said audio record and said pick-up head in response to a corresponding incremental movement of said control and visual component, means for responding to audio and visual information presented, and means actuated by said means for responding and coacting with said code means for controlling the relative movement between said control and visual component and said visual display station.

2. An audiovisual educational apparatus comprising: an audio reproduction system including a pick-up head; drive means for driving an audio record relative to said pick-up head, said record having a plurality of messages recorded thereon in spaced relation; means defining a visual display station; means for receiving an image support carrying a plurality of spaced visual images, said image support further including code means; means for effecting relative movement between said pick-up head and said record to select an audio message; means for effecting relative movement between said image support and said visual display station; synchronization means for positively correlating the position of said image support, relative to said display station, with the position of said pick-up head, relative to said record, said synchronization means including positioning means responsive to the position of said image support mechanically linking said image support with said pick-up head, said positioning means being adapted to provide a positive, incremental relative movement between said audio record and said pick-up head in response to a corresponding incremental movement of said image support; a responder mechanism including a plurality of manually operable key elements for making selective responses to audio and visual information presented; and means actuated by said manually operable key elements coacting with said code means for blocking said relative movement between said image support and said display station.

3. Apparatus as defined in claim 2 wherein:
said code means is operative to allow relative movement between said image support and said display station in varying degrees depending upon the particular response.

4. Apparatus as defined in claim 2 wherein said selective responses are made in reply to stimuli presented by said audio and visual information, each stimulus having a plurality of possible responses including at least one correct response, said apparatus including:
means for discriminating between a correct response and an incorrect response, at least certain of said incorrect responses effecting different degrees of relative movement between said image support and said display station.

5. Apparatus as defined in claim 2 including:
means actuated by said manually operable means to initiate operation of said drive means.

6. Apparatus as defined in claim 5 wherein:
said audio record comprises a rotatable disc record and further includes means for arresting said audio record after a single revolution with respect to said pick-up head.

7. Apparatus as defined in claim 1, wherein said image support comprises an elongated, card-like member.

8. Apparatus as defined in claim 1, wherein said images are provided by film strips extending in the direction of said relative movement.

9. Apparatus as defined in claim 3, wherein said code means includes means defining a plurality of apertures in said image support.

10. Apparatus as defined in claim 9, wherein said apertures are arranged in groups which are spaced in a manner equivalent to said image spacing, each said group including at least one circular aperture and at least one elongated, slot-like aperture, the major dimension of which extends in the direction of image support movement.

11. Apparatus as defined in claim 10, wherein at least one slot-like aperture in each group extends in overlapping relation with respect to an aperture in an adjacent group.

12. Apparatus as defined in claim 11, wherein at least one of said groups includes two slot-like apertures having different major dimensions.

References Cited

UNITED STATES PATENTS

| 3,141,243 | 7/1964 | Chapman et al. | 35—9 |
| 3,353,280 | 11/1967 | Emde | 35—9 |
| 3,369,307 | 2/1968 | Shupp | 35—9 |
| 3,376,657 | 4/1968 | Dorsett | 35—9 |
| 3,383,781 | 5/1968 | Diuzet | 35—9 |
| 3,395,464 | 8/1968 | Leslie et al. | 35—9 |
| 3,401,470 | 9/1968 | Gaven | 35—9 |
| 3,408,749 | 11/1968 | Brudner | 35—9 |

EUGENE R. CAPOZIO, Primary Examiner

W. W. NIELSON, Assistant Examiner

UNITED STATES PATENT OFFICE
CERTIFICATE OF CORRECTION

Patent No. 3,483,633                        December 16, 1969

Alfred E. Geils et al.

It is certified that error appears in the above identified patent and that said Letters Patent are hereby corrected as shown below:

Column 16, lines 24 and 26, claim reference numerals "1", each occurrence, should read -- 2 --.

Signed and sealed this 27th day of October 1970.

(SEAL)
Attest:

Edward M. Fletcher, Jr.                    WILLIAM E. SCHUYLER, JR.
Attesting Officer                            Commissioner of Patents